United States Patent
Kit Chik

(10) Patent No.: US 10,210,528 B2
(45) Date of Patent: Feb. 19, 2019

(54) METHOD AND SYSTEM FOR ASSESSING AND IMPROVING INDIVIDUAL CUSTOMER PROFITABILITY FOR A PROFIT-MAKING ORGANIZATION

(75) Inventor: Paul Chun Kit Chik, Pokfulam (HK)

(73) Assignee: International Business Machines Corporation, Armonk, NY (US)

( * ) Notice: Subject to any disclaimer, the term of this patent is extended or adjusted under 35 U.S.C. 154(b) by 4358 days.

(21) Appl. No.: 10/229,570

(22) Filed: Aug. 28, 2002

(65) Prior Publication Data

US 2003/0046204 A1 Mar. 6, 2003

(30) Foreign Application Priority Data

Sep. 5, 2001 (CN) .................................. 01132452

(51) Int. Cl.
*G06Q 30/02* (2012.01)
*G06Q 40/00* (2012.01)

(52) U.S. Cl.
CPC ............. *G06Q 30/02* (2013.01); *G06Q 40/00* (2013.01)

(58) Field of Classification Search
USPC ....................................................... 705/7, 10
See application file for complete search history.

(56) References Cited

U.S. PATENT DOCUMENTS

| | | | |
|---|---|---|---|
| 5,615,109 A * | 3/1997 | Eder ................................. | 705/8 |
| 5,666,493 A * | 9/1997 | Wojcik et al. ................... | 705/26 |
| 5,899,982 A | 5/1999 | Randle ............................. | 705/35 |
| 5,930,764 A | 7/1999 | Melchione et al. ............. | 705/10 |
| 5,970,478 A | 10/1999 | Walker et al. ................... | 705/35 |
| 6,009,415 A | 12/1999 | Shurling et al. ................. | 705/35 |
| 6,029,153 A | 2/2000 | Bauchner et al. ............... | 705/42 |
| 6,039,244 A | 3/2000 | Finsterwald .................... | 235/375 |
| 6,049,782 A | 4/2000 | Gottesman et al. ............. | 705/35 |
| 6,088,686 A | 7/2000 | Walker et al. ................... | 705/38 |
| 6,128,603 A | 10/2000 | Dent et al. ....................... | 705/40 |
| 6,131,810 A | 10/2000 | Weiss et al. ..................... | 235/379 |

(Continued)

FOREIGN PATENT DOCUMENTS

| | | | | |
|---|---|---|---|---|
| EP | 0987643 A2 | 3/2000 | ............. | G06F 17/60 |
| EP | 0987645 A2 | 3/2000 | ............. | G06F 17/60 |

OTHER PUBLICATIONS

Mulhern, "Customer Profitability Analysis: Measurement, Concentration, and Research Directions", Journal of Interactive Marketing, vol. 13, No. 1, 1999.*

(Continued)

*Primary Examiner* — Thomas L Mansfield
(74) *Attorney, Agent, or Firm* — Schmeiser, Olsen & Watts, LLP; Mark Vallone

(57) ABSTRACT

A system for assessing and improving individual customer profitability for a profit-making organization, comprising: a central database; means for collecting and identifying data elements relevant to customer profitability and quality from a plurality of sources, and inputting data into the central database; means for performing segmentation of customers to form a reasonable number of distinct groups of customers; means for building a mathematical model; and means for calculating the relative profitability/quality values of the customers in said organization, obtaining and maintaining for the organization a set of optimal marketing strategies to match the customer's needs.

16 Claims, 2 Drawing Sheets

(56) References Cited

U.S. PATENT DOCUMENTS

| | | | |
|---|---|---|---|
| 6,222,914 B1 | 4/2001 | McMullin | 379/144 |
| 6,226,623 B1 | 5/2001 | Schein et al. | 705/35 |
| 6,671,673 B1* | 12/2003 | Baseman et al. | 705/7 |
| 7,003,476 B1* | 2/2006 | Samra et al. | 705/10 |
| 7,080,066 B1* | 7/2006 | Scheurich et al. | |
| 7,103,562 B2* | 9/2006 | Kosiba et al. | 705/10 |
| 7,155,510 B1* | 12/2006 | Kaplan | 709/224 |
| 2002/0069079 A1* | 6/2002 | Vega | 705/1 |
| 2002/0133368 A1* | 9/2002 | Strutt et al. | 705/1 |

OTHER PUBLICATIONS

Conway, "The Customer Relationship Revolution—A Methodology for Creating Golden Customers", eLoyalty Corporation, Chicago, Ill, 1999.*

"Infographic: The 2017 'Martech 5000' Marketing Technology Landscape", pp. 1-3, retrieved on Sep. 1, 2017rom the Internet: <URL: https://martechtoday.com/infographic-marketing-technology-landscape-113956>.

Louis Gudema, "Marketing Technologies Every Company Must Use", pp. 1-3, retrieved on Sep. 1, 2017rom the Internet: <URL: https://hbr.org/2014/11/7-marketing-technologies-every-company-must-use>.

"Making marketing technology work", pp. 1-6, retrieved on Sep. 1, 2017rom the Internet: <URL: http://www.mckinsey.com/business-functions/marketing-and-sales/our-insights/making-marketing-technology-work>.

"Marketing Technology Explained: Everything You Need Know", pp. 1-2, retrieved on Sep. 1, 2017rom the Internet: <URL: http://adage.com/article/digital/marketing-technology-explained/308661/>.

* cited by examiner

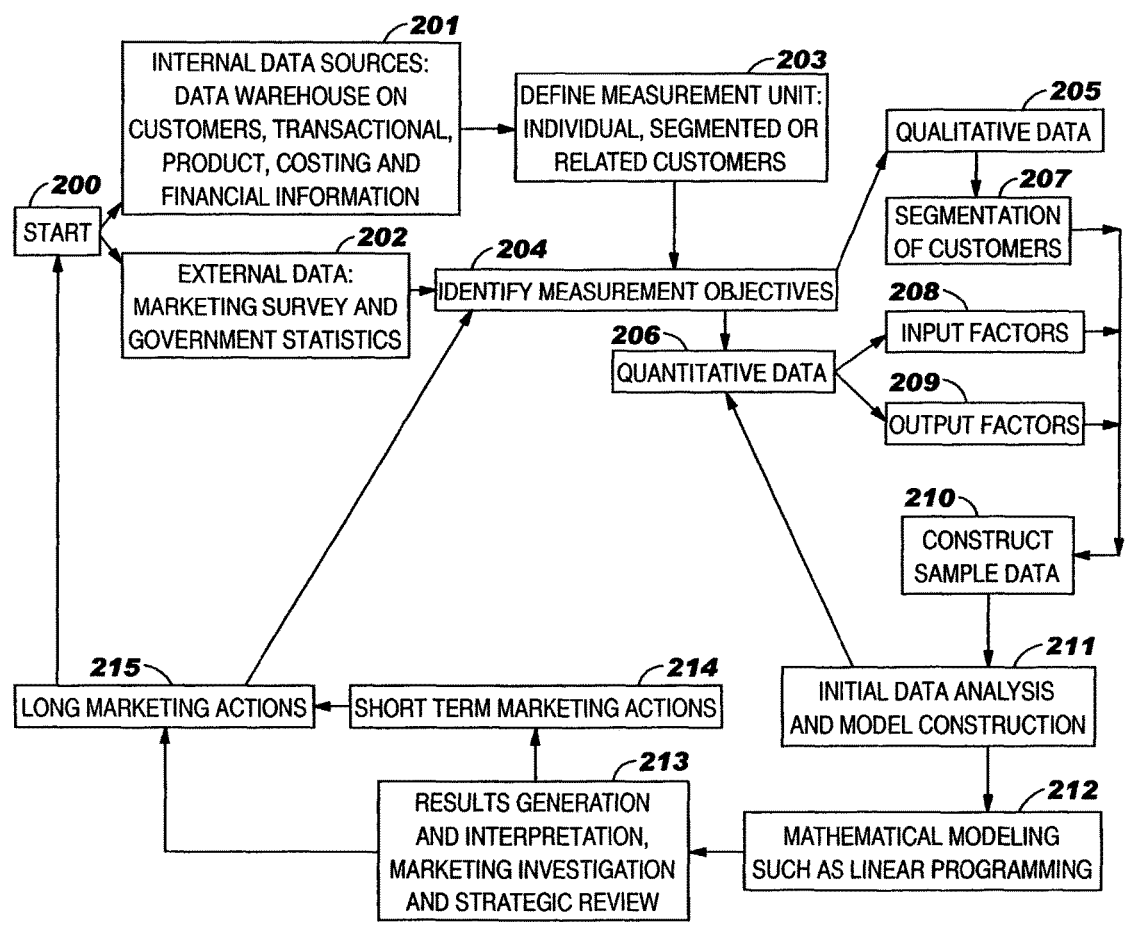

METHOD AND SYSTEM FOR ASSESSING AND IMPROVING INDIVIDUAL CUSTOMER PROFITABILITY FOR A PROFIT-MAKING ORGANIZATION

FIELD OF THE INVENTION

The invention relates to customer relationship management for a profit-making organization, and more specifically, to a method and system for assessing and improving individual customer profitability for a profit-making organization.

BACKGROUND

Customer Relationship Management is undoubtedly one of the most commonly used and effective marketing strategies to improve the profitability of organizations such as banks, airlines, and hotels. These organizations have adopted many different ways to understand their customers' behavior, analyze them, and identify who is profitable or not. A set of practical marketing campaign strategies or promotion plans is then derived to suit each individual customer's needs. However, not one of these customized methods has emerged as clearly best, in part because there is no one comprehensive method to collect, explore, and arrange customer behavioral information.

Many of these non-integrated methods currently deployed by organizations focus on the customers' side, namely, how much business customers bring in and how well or how likely these customers would be to respond to a marketing campaign. Little emphasis is placed on the other side, that is, what the company has been doing to the customers in a financial or marketing sense that causes these behavioral pattern or changes in their customers. In other words, what did the companies do to make their customers behave in such ways? Even though these companies have successfully identified who is or who is not profitable, they rarely have a set of clear or distinct strategies to encourage or discourage their customers to react in particular ways.

SUMMARY

The present invention provides a method and system for assessing and improving individual customer profitability for a profit-making organization. The method and system in the present invention allow a profit-making organization to determine an optimal mix of strategies for each individual customer. The method in the invention can be tailored to individual customers so as to tell the profit-making organization what their customers should do to maintain their profitaility.

The system for assessing and improving profitability for a profit-making organization according to the invention comprises: a central database; means for collecting and identifying data from a plurality of sources relevant to customer profitability and service quality, and inputting the data into the central database, wherein the data include quantitative data and qualitative data; means for processing the qualitative data and performing segmentation of customers to form a reasonable number of distinct groups of customers; means for processing the quantitative data to identify and separate the input and output factors; means for building a mathematical model based on the input factors, output factors and the customers segmentation; and means for measuring the relative profitability/quality values of the customers in the organization based on the mathematical model, deducing and maintaining a set of optimal marketing strategies for the organization tailored to customer needs.

In addition, the invention also provides a method for assessing and improving customers profitability for a profit-making organization, comprising: collecting and identifying data from a plurality of sources relevant to customer profitability and service quality, and inputting the data into a central database, wherein the data include quantitative data and qualitative data; processing the qualitative data and performing segmentation of customers to form a reasonable number of distinct groups of customers; processing the quantitative data to identify and separate the input and output factors; building a mathematical model based on the input factors, output factors and the customers segmentation; and measuring the relative profitability/quality values of the customers in the organization based on the mathematical model, deducing and maintaining a set of optimal marketing strategies for the organization tailored to customer needs. The method and system in the invention can assess and improve the profitability of a profit-making organization. The method and system according to the invention has the advantage of helping a profit-making organization to assess and improve individual customer profitability.

The objects and the advantages of the invention will be more apparent in the following description of the preferred embodiments with reference to the drawings.

BRIEF DESCRIPTION OF THE DRAWINGS

FIG. 2 is a flow chart of the method for assessing and improving the profitability of a profit-making organization.

DETAILED DESCRIPTION

Figure 1:
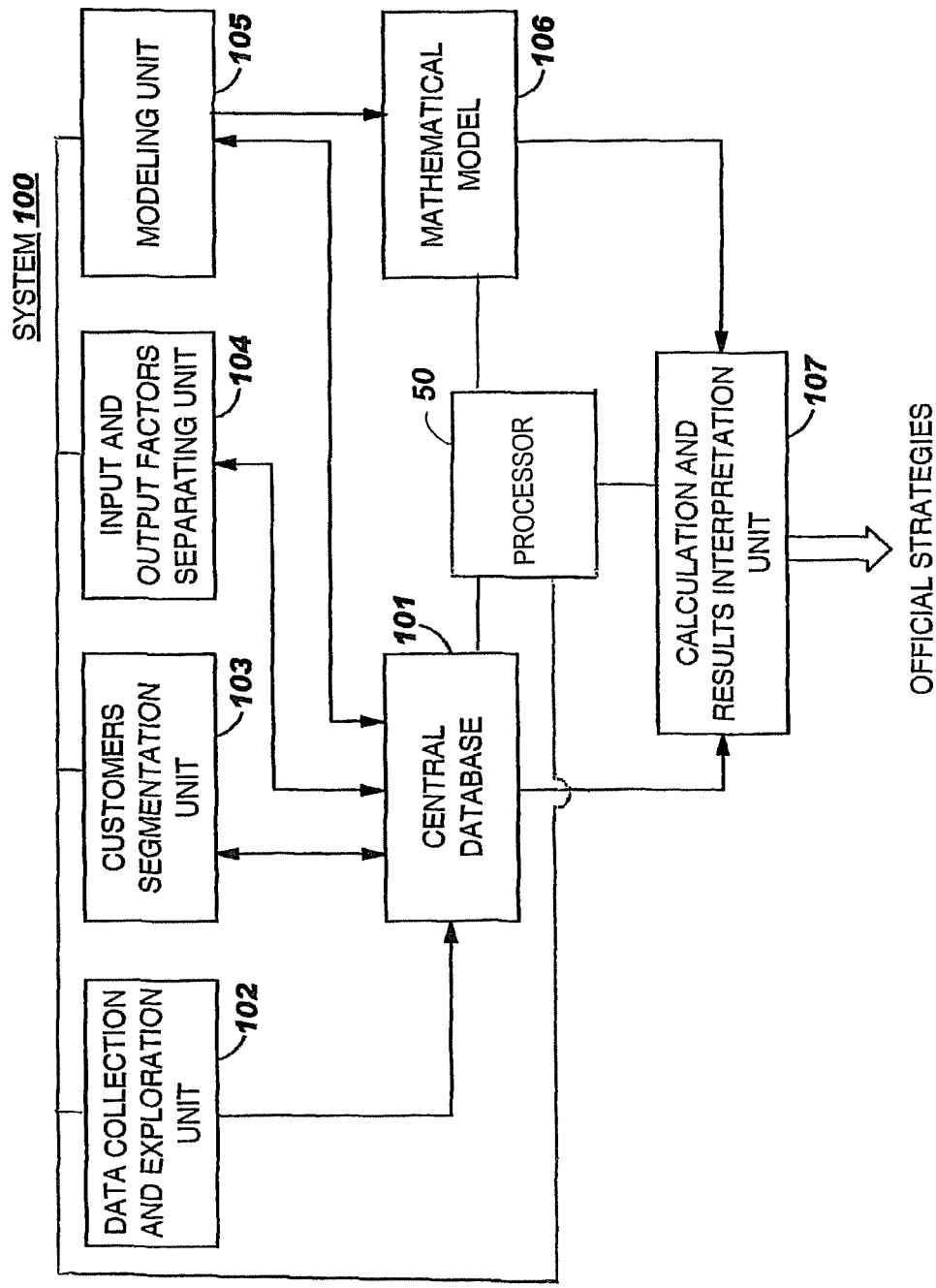
FIG. 1 is a block diagram that shows the system for assessing and improving the profitability of a profit-making organization.

As shown in FIG. 1, the inventive system 100 for assessing and improving individual customer profitability for a profit-making organization is a computer system that comprises: a processor 50, a central database 101; a data collection and exploration unit 102; a customer segmentation unit 103; an input and output factors separating unit 104; a modeling unit 105; a mathematical model 106; and a calculation and results interpretation unit 107. The function of each component will be described in detail below.

The data collection and exploration unit 102 identifies the main data sources that are relevant to customer profitability and quality. The data come mainly from two sources, internal and external. Internal data are generated within the organization, and are input into the central database 101 by the processor 50 after being collected, transformed and manipulated by the processor 50 which executes the units 102-105 and 107. External data are those collected and arranged by third parties outside the organization, such as government departments or market research agencies. The internal data focus on individual customer personal profiles, geographically, sociologically and demographically, as well as their behavioral or transactional activities regarding product and financial information. These data normally reside in a legacy, on-line transactional processing system or Data Warehouse within the organization. These data are normally stored and managed by database management system software products under control of the processor 50. The format and data contents must be unbiased, error free and non-summarized, namely, data must be at its most detailed level per customer. External data focus on the environmental factors that are uncontrollable by the organization. However, this information is helpful when information about environmental factors is needed in the modeling stage to assess the impact of these factors on customer behavior. In addition, the above data can be identified in other aspects. For example, the above data can be classified as quantitative or qualitative by determining whether they can be expressed in numeric value or not. Furthermore, the qualitative data are used to segment the customers, while the quantitative data are used to identify the input and output factors.

The customer segmentation unit 103 processes the qualitative data to form a reasonable number of distinct groups of customers who share the same or similar characteristics within groups, but have very different patterns and profiles between groups. The reasons for forming the groups are firstly to reduce the number of customers used during the modeling stage, and secondly to eliminate as much qualitative discrepancy as possible among customers during the modeling stage, and thirdly, to make verification of the model results easy so that any deterioration from the model results can be detected conspicuously.

The input and output factors separating unit 104 identifies and separates the input factors (utilization/resources) and output factors (revenue/profitability). These two factors form the fundamental basis of the model. The input factors are basically the resources of organizations that are available for spending on customers in the hope of a profitable return. The output factors are basically product utilization, productivity, or revenue generated by customers. Only when these two types of factors are determined can the modeling then take place. Depending on the kind of profitability or the quality of customers that organizations would like to assess and measure, these factors may interchange so that an input factor in one model could become an output factor in another. Therefore, care must be taken.

The modeling unit 105 builds mathematical model 106, for example a linear programming model, based on the input and output factors and the segmentation result.

The calculation and results interpretation unit 107 calculates ranking scores for each of the customers of the organization, with each of the scores being the relative score of the corresponding customer quality or profitability. The unit 107 further interprets the calculated results to find a set of optimal strategies. Once the mathematical model 106 is built, results interpretation follow. After all customers are processed, a ranking score is calculated to tell organizations how well each customer has done according to the model objective. Each customer is assigned a numeric score (between 0 and 1, this score can also be scaled to any range depending on the analyst's preference. e.g. 0 to 100). These scores are all relative scores, which means that the higher the score, the better quality or profitability. If a customer has a score of 1 using the 0 to 1 scale, this indicates that the customer is one of the best customers, and in this case one of the most profitable customers. Those who obtain less than 1 will be deemed as inefficient or less profitable.

Apart from the scores, a reference set of only the best customers, namely those with the relative score of 1, can also be identified. The purpose of the reference set is to provide a benchmark for inefficient customers to follow as an example in order to become one of the best customers. These results would be extremely useful to the marketing Department because not only can they now identify which customers are sub-optimal and why, but also how well they should be doing. Furthermore, as the results are individually based, each customer can have its suitable own goals and target level. Thus, a personal flavor can be added in the field of personalized Customer Relationship Management that many organizations have been looking for. Finally, another advantage of this invention over conventional CRM systems is that while most conventional CRM systems focus on which customers are performing profitably and why, very little effort has been put on the organizations' side. Instead of purely looking at what customers do and how much profit they produce, the invention also provides a new opportunity to organizations to review, learn and act from their own perspective in order to make their customers profitable.

From the above description of the system for assessing and improving profitability for a profit-making organization according to the invention, it can be seen that the invention can:

1) identify the required data for calculating and finding current customer profitability/quality relative to other customers;
2) help the organization to determine which factors or aspects of customer behavior result in customer costs, and which factors or aspects of customer behavior result in profit or income that customers contribute to the organization;
3) separate input and output factors; and
4) help the organization to determine what future aspects need improvement, from a marketing point of view, based on the input and output definitions.

The invention not only helps an organization to understand and identify each customer's requirements, but also helps the organization to determine what should be done to match the customers' needs.

A preferred embodiment of the method for assessing and improving the customers profitability for a profit-making organization according to the invention will be described with reference to FIG. 2.

As shown in FIG. 2, the method comprises the steps of:

Steps 201 and 202: collecting the data relevant to customers profitability/quality from internal and external sources;

Step 203: defining the measurement unit, which can be individual, segmented or related customers.

Step 204: identifying measurement objectives, including qualitative (205) and quantitative (206) data;

Step 207: processing the qualitative data to perform segmentation of customers;

Step 208: processing the quantitative data to separate input and output factors;

Step 210: constructing sample data;

Step 211: initializing data analysis and mathematical model construction;

Step 212: building a mathematical model, such as linear programming model;

Step 213: generating results and interpreting the results in order to do marketing research and make marketing strategy;

Step 214: doing short-term marketing actions; and

Step 215: doing long-term market actions.

As shown in FIG. 2, some of the above steps can be done recursively.

This invention provides a method for assessing the relative score of individual customer profitability/quality in an organization based on a mathematical model (for example a linear programming model), wherein the profitability/quality equals the ratio of customers' consumption of organization's resources and their respected realized turnover, while the relative profitability/quality is an objective comparison between the weighted ratio. The method can help a profit-making organization to find and maintain a set of optimal marketing strategies which can be tailored to customers' needs.

The invention has been described by reference to the embodiments and the drawings, which are intended to better illustrate the principle of the invention rather than to limit the invention. The invention can be modified and improved by those skilled in the art once taught the invention, without departing from the spirit and the scope of the claims.

I claim:

1. A method for improving profitability for a profit-making organization via improved marketing strategies, said method comprising:

collecting internal data from an internal source within the organization, wherein the internal data consists of individual customer data that includes geographic data of the individual customers, demographic data of the individual customers, and transaction data of the individual customers regarding products and financial information relating to transactional activities of the individual customers, and wherein the individual customer data is only at a level of highest detail for each customer such that the individual customer data does not include a summarization of said data that is only at said level of highest detail, and wherein the internal data is unbiased and error-free;

receiving external data from third parties outside the organization, wherein the external data comprises information about environmental factors that are uncontrollable by the organization, wherein the external data is unbiased and error-free, wherein the internal data and the external data collectively include quantitative data and qualitative data, wherein the quantitative data are expressed numerically, and wherein the qualitative data are not expressed numerically;

a processor of a computer system inputting the internal data and the external data into a central database of the computer system;

segmenting the customers through use of the qualitative data to form distinct groups of customers who share similar characteristics within the distinct groups, but have different characteristics between the distinct groups, wherein formation of the distinct groups of the customers via said segmenting reduces a total number of the customers used in a subsequent modeling stage during which a mathematical model is built, eliminates qualitative discrepancy among the customers during the modeling stage, and eases verification of the mathematical model so that any deterioration from results obtained from use of the mathematical model can be detected conspicuously;

processing the quantitative data to identify and separate input and output factors, wherein the input factors consist of resources of organizations that are available for spending on customers to obtain a profitable return from said spending, and wherein the output factors consist of product utilization, productivity, or revenue generated by customers;

during the modeling stage, building a mathematical model based on the input factors, the output factors, and the groups formed from said segmenting, wherein the mathematical model is a linear programming model, said segmenting having eliminated qualitative discrepancy among the customers during said building the mathematical model;

verifying the mathematical model, said verifying comprising detecting an erroneous result from use of the mathematical model, said detecting the erroneous result utilizing the groups formed from said segmenting, said detecting the erroneous result being performed more efficiently than if said groups formed from said segmenting were not were not utilized by said detecting;

said processor calculating, in accordance with the mathematical model, a numeric ranking score for each customer of the organization, wherein the ranking score for each customer is a relative score indicative of each customer's contribution to profitability of the organization, and wherein each ranking score is in a range of ranking scores defined by a lowest possible rank score and a highest possible rank score;

identifying best costumers of the organization consisting of all customers of the organization whose calculated ranking score is equal to the highest possible rank score;

finding and maintaining a set of optimal marketing strategies for the organization with respect to sub-optimal customers of the organization, said sub-optimal customers consisting of customers of the organization whose calculated ranking score is less than the highest possible rank score, said marketing strategies directed to increasing a subsequent ranking score of the sub-optimal customers of the organization by being tailored to the needs of the sub-optimal customers through utilization of the identified best customers as a benchmark; and implementing the marketing strategies, said implementing increasing the subsequent ranking score of the sub-optimal customers of the organization, resulting in improving the profitability of the organization.

2. The method of claim 1, wherein the third parties from whom the external data is received include government departments, and wherein the method comprises receiving the external data from the government departments.

3. The method of claim 1, wherein the third parties from whom the external data is received include market research agencies, and wherein the method comprises receiving the external data from the market research agencies.

4. The method of claim 1, wherein the output factors consists of product utilization, and wherein the method comprises processing the quantitative data to identify the output factors consisting of the product utilization.

5. The method of claim 1, wherein the output factors consists of productivity, and wherein the method comprises processing the quantitative data to identify the output factors consisting of the productivity.

6. The method of claim 1, wherein the output factors consists of revenue generated by customers, and wherein the method comprises processing the quantitative data to identify the output factors consisting of the revenue generated by customers.

7. The method of claim 1, wherein the numeric ranking score for each customer of the organization is a profitability/quality ratio equal to a ratio of consumption by each customer of resources of the organization to a realized turnover of each customer.

8. The method of claim 1, wherein said finding and maintaining the set of optimal marketing strategies comprises determining cost factors and income factors, wherein the cost factors pertain to behavior of the sub-optimal customers that result in costs associated with the sub-optimal customers, and wherein the income factors pertain to behavior of the sub-optimal customers that result in income from the sub-optimal customers.

9. A computer system comprising a processor and a central database, said processor configured to perform a method for improving profitability for a profit-making organization via improved marketing strategies, said method comprising:

collecting internal data from an internal source within the organization, wherein the internal data consists of individual customer data that includes geographic data of the individual customers, demographic data of the individual customers, and transaction data of the individual customers regarding products and financial information relating to transactional activities of the individual customers, and wherein the individual customer data is only at a level of highest detail for each customer such that the individual customer data does not include a summarization of said data that is only at said level of highest detail, and wherein the internal data is unbiased and error-free;

receiving external data from third parties outside the organization, wherein the external data comprises information about environmental factors that are uncontrollable by the organization, wherein the external data is unbiased and error-free, wherein the internal data and the external data collectively include quantitative data and qualitative data, wherein the quantitative data are expressed numerically, and wherein the qualitative data are not expressed numerically;

inputting the internal data and the external data into the central database of the computer system;

segmenting the customers through use of the qualitative data to form distinct groups of customers who share similar characteristics within the distinct groups, but have different characteristics between the distinct groups, wherein formation of the distinct groups of the customers via said segmenting reduces a total number of the customers used in a subsequent modeling stage during which a mathematical model is built, eliminates qualitative discrepancy among the customers during the modeling stage, and eases verification of the mathematical model so that any deterioration from results obtained from use of the mathematical model can be detected conspicuously;

processing the quantitative data to identify and separate input and output factors, wherein the input factors consist of resources of organizations that are available for spending on customers to obtain a profitable return from said spending, and wherein the output factors consist of product utilization, productivity, or revenue generated by customers;

during the modeling stage, building a mathematical model based on the input factors, the output factors, and the groups formed from said segmenting, wherein the mathematical model is a linear programming model, said segmenting having eliminated qualitative discrepancy among the customers during said building the mathematical model;

verifying the mathematical model, said verifying comprising detecting an erroneous result from use of the mathematical model, said detecting the erroneous result utilizing the groups formed from said segmenting, said detecting the erroneous result being performed more efficiently than if said groups formed from said segmenting were not were not utilized by said detecting;

calculating, in accordance with the mathematical model, a numeric ranking score for each customer of the organization, wherein the ranking score for each customer is a relative score indicative of each customer's contribution to profitability of the organization, and wherein each ranking score is in a range of ranking scores defined by a lowest possible rank score and a highest possible rank score;

identifying best costumers of the organization consisting of all customers of the organization whose calculated ranking score is equal to the highest possible rank score;

finding and maintaining a set of optimal marketing strategies for the organization with respect to sub-optimal customers of the organization, said sub-optimal customers consisting of customers of the organization whose calculated ranking score is less than the highest possible rank score, said marketing strategies directed to increasing a subsequent ranking score of the sub-optimal customers of the organization by being tailored to the needs of the sub-optimal customers through utilization of the identified best customers as a benchmark; and implementing the marketing strategies, said implementing increasing the subsequent ranking score of the sub-optimal customers of the organization, resulting in improving the profitability of the organization.

10. The computer system of claim 9, wherein the third parties from whom the external data is received include government departments, and wherein the method comprises receiving the external data from the government departments.

11. The computer system of claim 9, wherein the third parties from whom the external data is received include market research agencies, and wherein the method comprises receiving the external data from the market research agencies.

12. The computer system of claim 9, wherein the output factors consists of product utilization, and wherein the method comprises processing the quantitative data to identify the output factors consisting of the product utilization.

13. The computer system of claim 9, wherein the output factors consists of productivity, and wherein the method comprises processing the quantitative data to identify the output factors consisting of the productivity.

14. The computer system of claim 9, wherein the output factors consists of revenue generated by customers, and wherein the method comprises processing the quantitative data to identify the output factors consisting of the revenue generated by customers.

15. The computer system of claim 9, wherein the numeric ranking score for each customer of the organization is a profitability/quality ratio equal to a ratio of consumption by each customer of resources of the organization to a realized turnover of each customer.

16. The computer system of claim 9, wherein said finding and maintaining the set of optimal marketing strategies comprises determining cost factors and income factors, wherein the cost factors pertain to behavior of the sub-optimal customers that result in costs associated with the sub-optimal customers, and wherein the income factors pertain to behavior of the sub-optimal customers that result in income from the sub-optimal customers.

* * * * *